Aug. 22, 1933.                D. BENJAMIN                 1,923,414
                        BALL AND SOCKET CONNECTION
                            Filed July 14, 1928
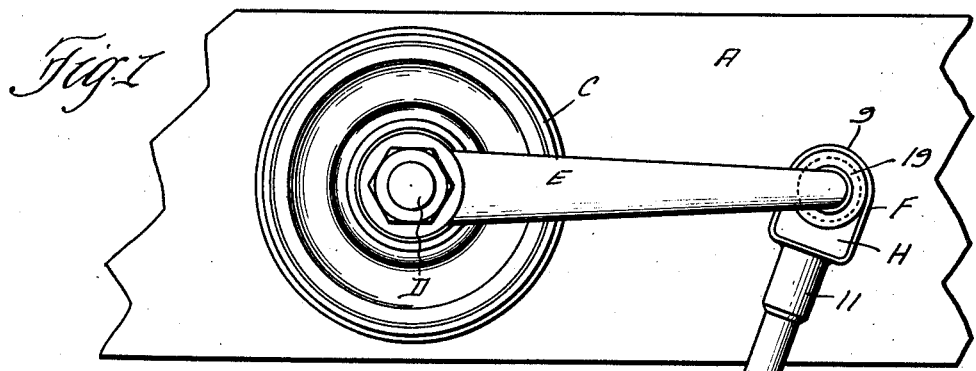
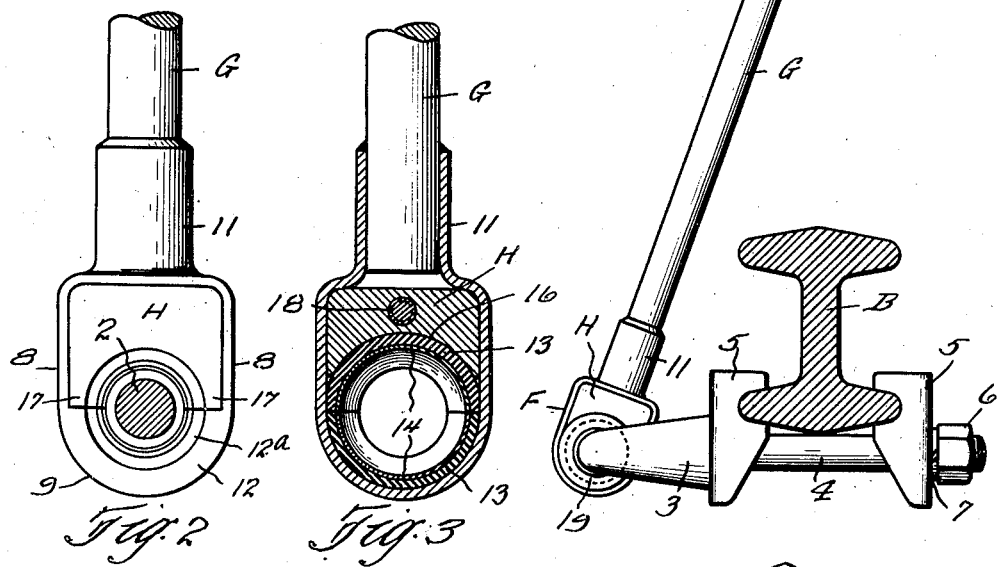
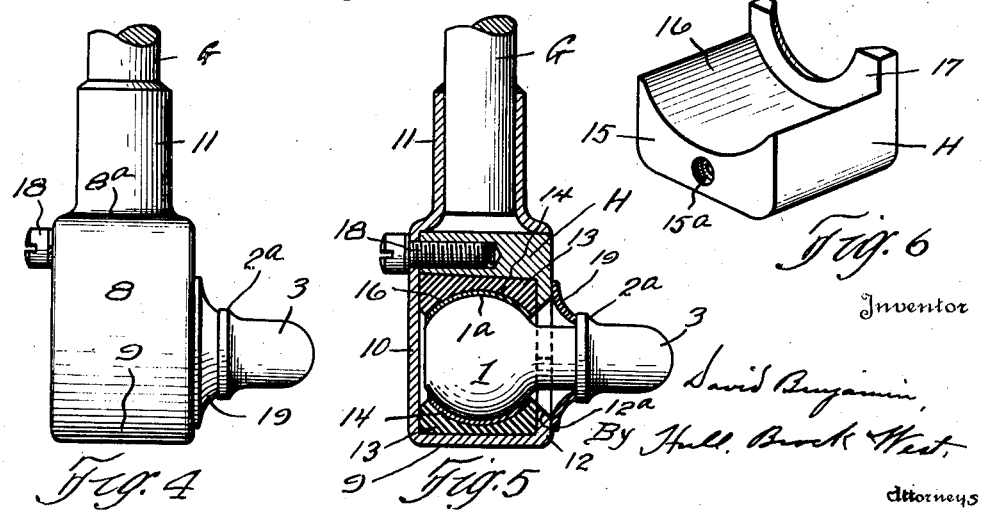

Patented Aug. 22, 1933

1,923,414

UNITED STATES PATENT OFFICE 1,923,414

BALL AND SOCKET CONNECTION

David Benjamin, Cleveland Heights, Ohio, assignor to The Gabriel Company, Cleveland, Ohio, a Corporation of Ohio Application July 14, 1928. Serial No. 292,612

4 Claims. (Cl. 287—90)

This invention relates to ball-and-socket connections and, while the connection described herein is particularly adapted for use as a means for operating shock absorbers for vehicles, it is capable of other uses and of wider applications than the one specifically mentioned.

It is the general purpose and object of the invention to provide an efficient connection of the type referred to, and more particularly to provide a socket mounting which may be readily assembled and disassembled; also to provide a connection of the character referred to which will effectually prevent the entrance of dust between the working parts thereof. Further and more limited objects and advantages of the invention will appear hereinafter in the detailed description.

In the drawing, Fig. 1 represents a sectional side elevation of the side frame and axle of an automobile having a shock absorber applied thereto and including a connecting rod provided with my invention; Fig. 2 an elevation of the lower end of the connecting rod, showing the ball-supporting stud in section; Fig. 3 a detail in section through the socket shown in Fig. 2; Fig. 4 a side elevation of the lower end of the connecting rod, of the housing, and of the arm having the ball within the housing; Fig. 5 a detail in section through the socket housing shown in Fig. 1, the view being taken at right angles to Fig. 3, and the ball, stud and arm being shown in elevation; and Fig. 6 a detail in perspective of the locking wedge member of the mounting.

Describing the parts by reference characters, A denotes the side frame member and B the axle of an automobile. Secured to the side frame member A is the casing C of a liquid-containing shock absorber. Projecting from the casing is the shaft D which operates the vane or piston (not shown), while E denotes an arm secured to the shaft and having at its outer end a stud carrying a ball 1 mounted in the socket housing, indicated generally at F. The socket housing is carried by a connecting rod G having at its lower end another housing F, preferably identical with the housing at the upper end thereof, the housing F receiving a ball 1 on a stud 2 projecting from an arm 3 constituting an extended head of a bolt 4, by means of which bolt and a pair of clamps 5, through which the bolt extends, the said arm and ball are supported from the axle. The bolt is provided with a nut 6 and washer 7.

As stated hereinbefore, the socket mountings are identical; and a detailed description of one of these mountings will suffice for both, the one shown in detail herein being the one at the lower end of the rod G. Each socket mounting comprises the housing F referred to hereinbefore. The housing consists generally of side walls 8 merging at their lower ends with a semi-cylindrical bottom wall 9 and also having a rear wall 10. From the upper part of the housing extends a sleeve 11 by which the housing is attached to the lower end of the connecting rod G. The front of the housing is substantially open, except for the semi-annular flange 12 which projects inwardly and upwardly from the curved wall 9, the inner edge 12$^a$ of the flange being beveled. The upper portion of the front of the housing is open.

Mounted within the housing are the upper and lower socket bearing members, each consisting of an outer body or backing 13 made preferably of soft rubber and having vulcanized thereto an inner graphite bronze lining 14. The graphite bronze lining 14 of each of these members is formed as a segment of a sphere, the two lining members 13 forming, when assembled, a continuous bearing surface for the segmental spherical surface 1$^a$ of the ball 1, but being open front and back, as shown, the stud 2 projecting through the front opening.

In practice, the lower bearing member 13, 14, is placed in the lower portion of the housing F, the ball 1 is placed upon this lower member, and the upper member 13, 14 is inserted through the large opening provided in the front of the housing and applied to the upper surface of a ball. Then, in order to retain the bearing in place, I employ a combined wedging and locking member, indicated generally at H. This member consists generally of a body 15 having a face 16 which is approximately semi-cylindrical whereby it may receive and conform to the upper surface of the part 14 of the upper bearing member, the said face 16 also tapering upwardly and rearwardly from the front flange 17, as will appear from Fig. 5. The flange 17 is symmetrical with respect to the flange 12 so that, when the locking member is drawn to its seat, as by means of the bolt 18 which is threaded into the opening 15$^a$ in said locking member, the lower ends of the flange 17 will rest on the upper ends of the flange 12. The upper surface of the locking member 15 conforms to and seats against the upper portions 8$^a$ of the side walls 8 of the housing F.

It will be noted that a flange 2$^a$ projects outwardly from the stud 2. Between this flange and the front face of the locking member H and the flange 12, is interposed a frusto-conical rubber washer 19, the inner wall of the washer engaging the said flange while its outer and larger edge portion engages the front face of the member H and the flange 12, thereby effectively protecting the ball-and-socket joint against the entrance of dust.

The ball mounting disclosed herein is simple of construction, cheap of production, and may be readily assembled and disassembled; and it realizes the foregoing advantages and accomplishes in a most efficient manner the purpose for which it is designed.

For convenience of description, the substantially open side of the housing F has been referred to and will be referred to hereinafter as the "front" side or face and the opposite side will be referred to as the "rear" side or face. Furthermore, for convenience of description, the housing will be assumed as used in the positions indicated in Figs. 2-5 inclusive, and the terms "stop" and "bottom" have been employed, and will be employed hereinafter, in identifying the positions of the parts of and within the housing. However, by the use of these terms I do not propose to limit the use of my invention to any particular position of the housing, with a corresponding limitation as to the positions of the parts therewithin.

Having thus described my invention, what I claim is:

1. A socket mounting comprising a housing having a semi-cylindrical bottom wall and having its front thereof substantially open and provided with a semi-annular flange projecting upwardly from the front edge thereof, a bearing in said housing, the said bearing consisting of an upper and a lower anti-friction bearing member each having a hemispherical surface adapted to engage the cooperating surface of a ball and each having a substantially semi-cylindrical backing of resilient deformable material, the said bearing members providing, when assembled, a front opening for a stud by which the ball is supported, and means for securing the said bearing members in the said housing, said means comprising a locking member in said housing and having a front depending flange engaging the front of the backing on the upper bearing member and a body portion extending rearwardly from said flange and engaging the upper surface of the backing on the upper bearing member.

2. A socket mounting comprising a housing having an opening in the front thereof and provided with a flange projecting upwardly from the lower front edge thereof, a bearing in said housing, the said bearing consisting of an upper and a lower anti-friction bearing member each having a hemispherical surface adapted to engage the cooperating surface of a ball and each having a backing of resilient deformable material, the said bearing members providing, when assembled, a front opening for a stud by which the ball is supported, and means for securing the said bearing members in the said housing, said means comprising a locking member in said housing and having a front depending flange engaging the front of the backing on the upper bearing member and a body portion extending rearwardly from said flange and engaging the upper surface of the backing on the upper bearing member.

3. A socket mounting comprising a housing having an opening in the front thereof and provided with an inwardly extending flange at one of the edges thereof, a bearing in said housing, the said bearing consisting of a pair of anti-friction bearing members having hemispherical surfaces adapted to engage the cooperating surface of a ball and each having a backing of resilient deformable material, the said bearing members providing, when assembled, a front opening for a stud by which the ball is supported, and means for securing the said bearing members in the said housing, said means comprising a locking member having a front flange engaging the front of the backing on one of the bearing members and a body portion extending rearwardly from said flange and engaging the outer surface of the backing on said bearing member, the backing-engaging surface of the locking member being inclined from the front toward the rear thereof to force the bearing member with which it cooperates toward the other bearing member, and means for moving the said locking member toward the rear of the housing and for securing the same to the said housing.

4. A socket mounting comprising a housing having an opening in the front thereof, a bearing in said housing, the said bearing consisting of a pair of anti-friction bearing members having hemispherical surfaces adapted to engage the cooperating surface of a ball, the said bearing members providing, when assembled, a front opening for a stud by which the ball is supported, and means for securing the said bearing members in the said housing, said means comprising a locking member having a front depending flange engaging the front of one of the bearing members and a body portion extending rearwardly from said flange and engaging the back of said bearing member, the back-engaging surface of the locking member being inclined from the front toward the rear thereof to force the bearing member with which it cooperates toward the other bearing member, and means for moving the said locking member toward the rear of the housing and for securing the same to the said housing.

DAVID BENJAMIN.